United States Patent [19]

Otsuki et al.

[11] Patent Number: 5,194,771
[45] Date of Patent: Mar. 16, 1993

[54] BRUSHLESS CORE MOTOR

[75] Inventors: Noboru Otsuki; Hajime Masuya, both of Komagane, Japan

[73] Assignee: Kabushiki Kaisha Sankyo Seiki Seisakusho, Japan

[21] Appl. No.: 825,538

[22] Filed: Jan. 24, 1992

Related U.S. Application Data

[63] Continuation of Ser. No. 580,805, Sep. 11, 1990, abandoned.

Foreign Application Priority Data

Sep. 14, 1989 [JP] Japan ............... 1-107799[U]
Jul. 30, 1990 [JP] Japan ............... 2-79799[U]

[51] Int. Cl.$^5$ .................. H02K 11/00; H02K 1/24
[52] U.S. Cl. .................. 310/68 B; 310/269
[58] Field of Search .......... 310/68 R, 68 B, 111, 310/181, 186, 254, 267, DIG. 3, 67 R, 156, 179, 190, 191, 198, 209, 218, 269

[56] References Cited

U.S. PATENT DOCUMENTS

| | | | |
|---|---|---|---|
| 4,031,419 | 6/1977 | Spiesberger et al. | 310/49 R |
| 4,357,563 | 11/1982 | Ohno | 318/254 |
| 4,529,900 | 7/1985 | Uzuka | 310/43 |
| 4,549,104 | 10/1985 | Niimura et al. | 310/67 R |
| 4,554,491 | 11/1985 | Plunkett | 318/254 |
| 4,570,093 | 2/1986 | Morii et al. | 310/46 |
| 4,633,110 | 12/1986 | Genco et al. | 310/71 |
| 4,672,253 | 6/1987 | Tajima et al. | 310/269 |
| 4,700,098 | 10/1987 | Kawashima | 310/186 |
| 4,719,378 | 1/1988 | Katsuma et al. | 310/67 R |
| 4,737,674 | 4/1988 | Miyao | 310/268 |
| 4,804,873 | 2/1989 | Shiraki et al. | 310/67 R |

Primary Examiner—Steven L. Stephan
Assistant Examiner—D. R. Haszko
Attorney, Agent, or Firm—Welsh & Katz, Ltd.

[57] ABSTRACT

A brushless core motor featuring improved positional relationship between magneto-sensitive elements and core windings to prevent distortion of the output from the elements, enable a reduction in the thickness of the motor, and assure reduced and uniformly distributed leakage of magnetic flux. The motor includes an armature core having a plurality of salient poles, a plurality of windings in "m" phases (the term "m" expresses an integer $\geq$ two) which are wound on the salient poles, a rotor magnet rotatable in an opposed relation with the salient poles, and "n" magneto-sensitive elements (the term "n" = an integer satisfying the relation of $m \geq n$) for detecting the magnetic poles of the rotor magnet in order to effect electric conduction control of the windings in the m phases. The magneto-sensitive elements are disposed in the vicinity of the rotor magnet, and, of the salient poles, having no windings are disposed adjacent the magneto-sensitive elements.

12 Claims, 4 Drawing Sheets

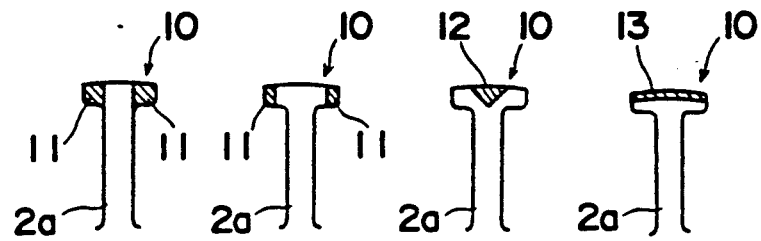
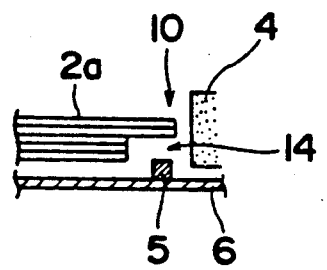

BRUSHLESS CORE MOTOR

This is a continuation of application Ser. No. 580,805, filed Sep. 11, 1990 now abandoned.

BACKGROUND OF THE INVENTION

Field of the Invention

The present invention relates to a brushless core motor, and more particularly, to an improved brushless motor, of which magneto-sensitive elements (e.g. hall elements) and core windings are located in an improved relative position with each other.

In general, a brushless core motor consists of a rotor formed from a permanent magnet which produces a magnetic field, a stator including a core and armature windings on the core, and a commutating mechanism including a magnetic pole sensor and semiconductor switch. In such an arrangement, the control for electricity conduction in the motor requires provision of magnetic sensitive elements in the vicinity of the permanent magnet in order to detect the location of the magnetic pole.

In order to meet such requirements, a common brushless core motor has, for instance, the arrangement shown in FIGS. 6A and 6B, wherein hall elements 105 are each mounted at a given point on a printed circuit board 106 so that they are disposed in the vicinity of a magnet 102 secured to an inner peripheral surface of a rotor case 101 and further disposed between two adjacent salient poles 104 of a core, on which poles 104, windings 103 are wound. Such salient poles of a core will be simply referred to as "the salient poles" throughout the specification.

In another motor arrangement, as shown in FIGS. 7A and 7B, hall elements 105a are each mounted on a printed circuit board 106a such that they correspond to an imaginary salient pole 104a above the hole element 105, which pole 104a is practically cut off over its entire body as indicated by dotted lines.

However, with a motor having the arrangement in FIGS. 6A and 6B, each hole element 105 is disposed between adjacent salient poles 104, which requires the hall elements 105 to be positioned away from the core windings 103, so as to avoid contact therebetween with the result that the body of the motor is inevitably thick, and, the arrangement is not suited for use in thin motors. Even assuming no possibility of the contact between hall elements 105 and core windings 103, the disposition of the hall elements 105 close to the core windings 103 enhances a likelihood of the hold elements 105 being influenced by the magnetic flux of the core windings 103, thus involving the risk that the outputs of the hall elements 105 may be distorted. The brushless motor is constructed generally such that the outputs from the hall elements are obtained as they are to amplify them for sinewave conduction. Therefore, if the waves of the outputs from the hall elements are distorted, resultant torque ripples become so large as to deteriorate the motor efficiency and cause rough or erratic rotation of the motor.

On the other hand, the motor arrangement in FIGS. 7A and 7B has no salient pole against the hall elements 11)5, which is not satisfactory in that there is no concentration of the magnetic flux in the area of the salient pole corresponding to the hall elements 105, thus resulting in a large leakage of magnetic flux from that area towards the other side, and thereby creating unequal distribution of the leaking magnetic flux (see FIG. 5A). As a result, large torque ripples occur in the motor, or the outputs of the hall elements 105 show distorted waves (see FIG. 5B), which results in a rough motor rotation.

SUMMARY OF THE INVENTION

It is a first object of the present invention to provide a brushless core motor which avoids any distortion in the outputs of the magneto-sensitive elements.

A second object of the present invention is to provide a brushless core motor whose thickness can be reduced.

A third object of the present invention is to provide a brushless core motor in which the leakage of magnetic flux is reduced and uniformly distributed around the salient poles in the motor.

In order to achieve the above-stated objects, a brushless core motor according to the present invention comprises: an armature core having a plurality of salient poles; a plurality of windings in "m" phases (the term "m" expresses an integer greater than or equal to two) which are wound on the salient poles; a rotor magnet rotatable in an opposed relation to the salient poles; and "n" pieces of magneto-sensitive elements (the term "n" expresses an integer where $m \geq n$) for detecting the magnetic poles of the rotor magnet in order to effect electric conduction control of the windings in the m phases, wherein the magneto-sensitive elements are disposed in the vicinity of the rotor magnet, and wherein, of the salient poles, the one positioned in the vicinity of the "n" pieces of magneto-sensitive elements is devoid of windings.

Preferably, the brushless core motor according to the present invention is such that those salient poles on which the windings in the m phases are wound comprises the product of m·k salient poles (the term "k" expresses an integer greater than or equal to two), each of the m·k salient poles carrying one of the windings thereon corresponding to one of the m phases; further, those salient poles positioned in the vicinity of the magneto-sensitive elements amount to n in total number, with the n pieces of salient poles being disposed in correspondence to the different respective m phases.

Preferably, the brushless core motor according to the present invention is constructed such that the salient poles comprise first salient poles which are disposed in the vicinity of the magneto-sensitive elements and devoid of the windings thereon, and second salient poles having the windings thereon, the first salient poles having their respective distal ends disposed adjacent to the rotor magnet, the distal ends being each so contoured as to prevent intensive concentration of the magnetic flux upon the first salient poles as opposed to that on the second salient poles. For example, each of the first salient poles may have a notched part formed on the distal end thereof adjacent the rotor magnet, the notched part being formed with a symmetrical or asymmetrical shape. If the core is formed from a lamination of plural silicon steel plates, a suitable shape may be achieved either by notching a party of the laminated steel plates, the notched part being positioned on the distal end of each of the first salient poles close to the rotor magnet and also positioned close to the magneto-sensitive element, or by notching such a part of the steel plates with different configurations in different ones of the plates.

With the above-described arrangements, the magnetic flux is evenly concentrated on the salient poles of the core in the vicinity of the magneto-sensitive elements. Therefore, the magnetic flux leakage is reduced in amount, and this reduction occurs evenly throughout the entire circumference of the salient poles. Furthermore, the magneto-sensitive elements are free from influence by the magnetic flux of the core windings.

Consequently, with the brushless core motor according to the present invention, the hall elements are not influenced by the magnetic field generated by the windings while current flows. Besides, the magnetic flux is concentrated on the salient poles, thereby achieving reduced magnetic flux leakage and uniform distribution of the leaking magnetic flux which, in turn, prevents distortion of the outputs of the hall elements. Thus, it is possible to assure small torque ripples, and smooth rotation of the motor. Furthermore, according to the present invention, the hall elements, which are isolated from the influence of the magnetic flux of the core windings, can be positioned in the vicinity of the salient poles, thereby enabling a reduction in the thickness of the main body of the motor.

BRIEF DESCRIPTION OF THE DRAWINGS

FIGS. 3A through 3E are fragmentary plan views showing different examples of shapes of salient poles;

DETAILED DESCRIPTION

A specific description will be made of preferred embodiments of the present invention, with reference to the accompanying drawings.

Figure 1:
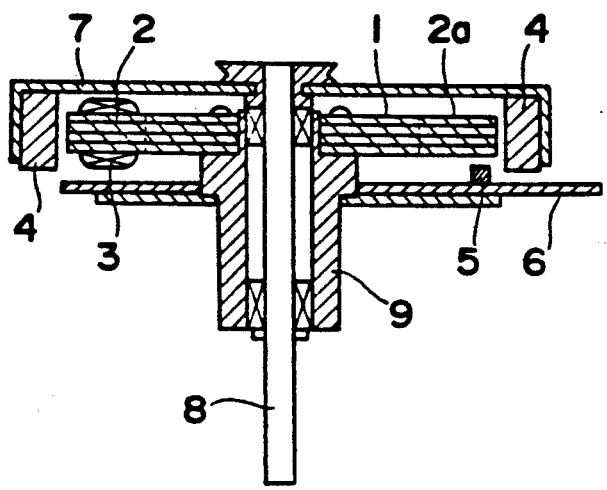
FIG. 1 is a sectional view of a brushless core motor according to one embodiment of the present invention, taken along a plane including a rotor shaft of the motor.

FIG. 1 shows one embodiment of a brushless core motor according to the present invention. The motor includes an armature core 1 having a plurality of salient poles 2, 2a projecting radially therefrom; a plurality of windings 3 in "m" phases (the term "m" is an integer greater than or equal to two) which are wound on the salient poles 2; a rotor magnet 4 supported on a rotor shaft 8, the magnet 4 being rotatable about the axis of the shaft 8 in a direction circumferentially of salient poles 2, 2a, with the inner surface of the magnet 4 being in opposed relation to the free ends of the poles 2; and "n" pieces of magneto-sensitive elements or hall elements 5, wherein the "n" indicates an integer, the hall elements 5 being capable of detecting the magnetic poles of the rotor magnet 4 in order to supply the proper electricity to the windings 3 in the "m" phases, thereby causing the rotor magnet 4 to rotate in a given direction. The hall elements 5 are disposed in the vicinity of the rotor magnet 4 and the salient poles 2a, with each hall element 5 corresponding to one of the m phases. Those salient poles 2a in the vicinity of the hall elements 5 do not have windings 3 wound thereon. The number n of the magneto-sensitive elements 5 is an integer being equal to or smaller than the number m of the winding phases; in other words, an integer satisfying the relation of n·m. Thus, the number n of the magneto-sensitive element 5 is never greater than the number m of the winding phases. The motor further includes a printed circuit board 6, a rotor case 7, a rotor shaft 8, and a seat 9 for accommodating bearings.

Figure 2B:
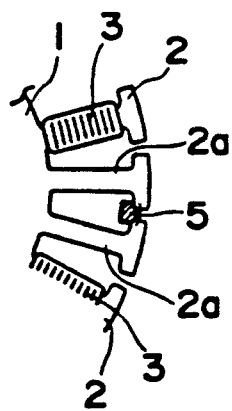
FIG. 2B is a fragmentary plan view showing another example of the positional relationship between a hole element and windings.
Figure 2A:
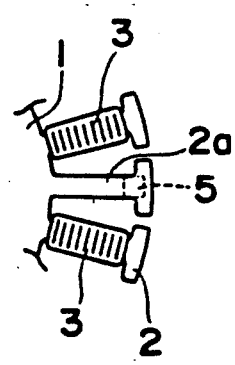
FIG. 2A is a fragmentary plan view showing an example of the positional relationship between a hole element and windings.

As stated before, none of the windings 3 are wound on those salient poles 2a which are closer to the hall elements 5 than the other salient poles 2 are. This is exemplified in FIGS. 2A and 2B to facilitate the understanding thereof: FIG. 2A shows the arrangement of a salient pole 2a without windings right above the hall element 5, and FIG. 2B shows a pair of salient poles 2a without windings to be arranged on the opposite sides of the hall element 5. In the embodiment shown, it is noted that the salient poles 2a without the windings 3 thereon are of the same shape and structure as that of the other salient poles 2 with windings thereon.

FIGS. 3A through 3D show embodiments employing various different modes of the salient poles 2a without windings. In these embodiments, there are illustrated four different types of salient poles 2a having no windings. Each of them is formed with a different distal end 10, disposed close to the rotor magnet 4. The variety of distal ends 10 are intended to prevent the magnetic flux of the rotor magnet 4 from being concentrated on the windingless pole 2a, whereby an increased amount of the magnetic flux is allowed to flow from the rotor magnet 4 to the hall element 5 through the salient pole 2a without the windings, hence attaining increased output from the hall elements 5. To produce those unique salient poles 2a, during the stamping of the core 1 by a press, a part of the distal end 10 of each salient pole 2a, close to the rotor magnet 4, is cut off in such a manner that, as shown in FIG. 3A, the circumferentially protruding portions 11 of the salient pole 2a are completely removed to achieve the projecting shape of the salient pole 2a. Alternatively, as shown in FIG. 3B, only parts of the circumferentially protruding portions 11 of the salient pole 2a are removed to reduce the circumferential width of the salient pole 2a; or as in FIG. 3C, a groove 12 is formed in the distal end of the salient pole; or, as in FIG. 3D, a portion 13 of the salient pole 2a, which faces towards the rotor magnet 4, is entirely removed so that a newly formed distal end face of the salient pole 2a is defined more inwardly away from the rotor magnet 4. In the FIGS. 3A to 3D, it should be understood that the hatching in each distal end 10 indicates the above-discussed removed portions.

The above-described examples suggest cutting off the distal end 10 in a symmetrical way relative to the pole 2a. Alternatively, however, an asymmetrical cutting may be performed by, for instance, cutting the salient pole 2a only on one side thereof. Alternatively, since the core 1 is generally formed from a lamination of plural silicon steel plates or the like, it is possible to, as shown in FIG. 3E, cut off a part of the laminated steel plates to form a stepped portion 14. For such partial cutting in FIG. 3E, it is preferable to cut the part adjacent to the hall element 5. Alternatively, the plural layers of such lamination may be each reformed to define the stepped portion 14.

Figure 4A:
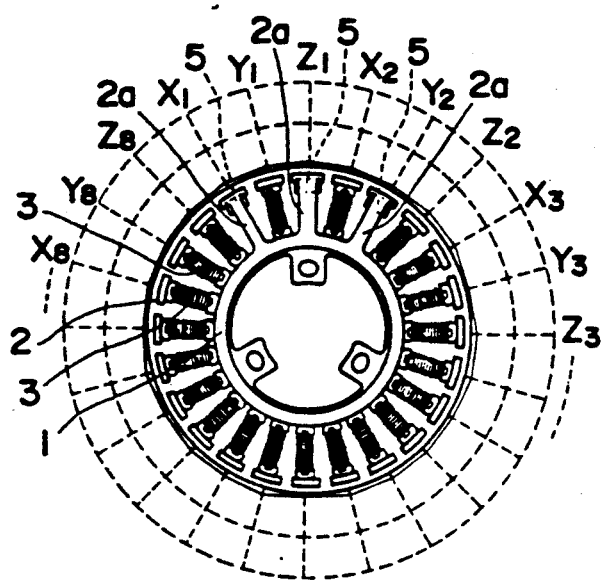
FIG. 4A is a view used to explain the positional relationship between hall elements and windings in a three-phase brushless core motor embodying the present invention and having 24 salient poles, as well as to explain the distribution of the leaking magnetic flux.

With the foregoing arrangements, the leaking magnetic flux within the motor is distributed at lower level and uniformly as shown in FIG. 4A.

Referring to FIG. 4A, there is shown a three-phase brushless core motor having windings 3 in three phases (m=3), and twenty-four salient poles 2 and 2a formed on a core 1 (m·k=24). The salient poles 2 and 2a are formed about the core 1 circumferentially so that they are spaced apart from one another equidistantly and at equal angles relative to the center of the core 1. Each of the salient poles designated by 2 carries the windings 3 thereon, each corresponding to the first, second and third phases, respectively, within the motor. The arrangement of the windings 3 is such that every third salient pole 2 sequentially carries a first series of windings $X_1$ to $X_8$ in the first phase, a second series of windings $Y_1$ to $Y_8$ in the second phase, and a third series of windings $Z_1$ to $Z_8$ in the third phase. Three hall elements 5 (n=3) are disposed in correspondence with the three phases. The three salient poles designated by 2a, each being closest to the hall elements 5, are devoid of the windings $X_1$, $Z_1$ and $Y_2$ as illustrated.

Accordingly, by virtue of those salient poles 2a without windings being provided adjacent the hall elements 5, the leaking magnetic flux is thereby reduced in amount as against the aforementioned prior art, and the reduction occurs evenly throughout the circumference of the salient poles 2 and 2a (see FIG. 4A).

Figure 4B:
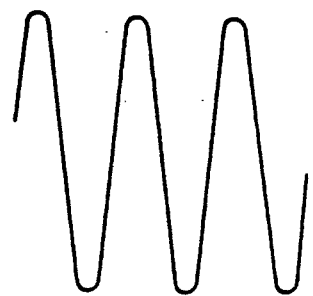
FIG. 4B is a diagram showing oscillographic waves formed by outputs from the hall elements of the motor shown in FIG. 4A.
Figure 5A:
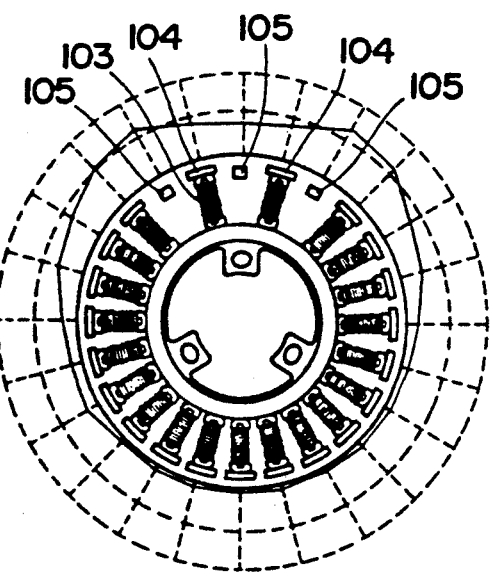
FIG. 5A is a view used to explain the distribution of the leaking magnetic flux in the conventional three-phase brushless c re motor shown in FIGS. 7A and 7B.
Figure 5B:
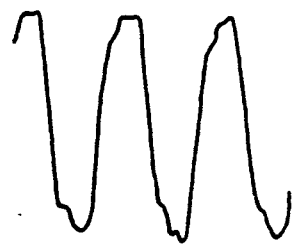
FIG. 5B is a diagram showing oscillographic waves formed by outputs from hall elements of the conventional motor.
Figure 6B:
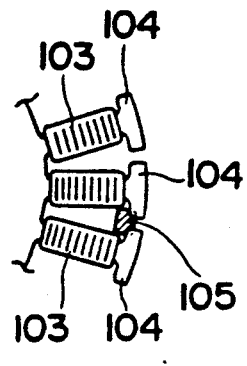
FIGS. 6A and 6B are views showing the positional relationship between hall elements and core windings of a conventional brushless core motor, the FIG. 6A being a fragmentary sectional view of a rotor magnet and a core winding, while the FIG. 6B is a fragmentary plan view of a core.
Figure 6A:
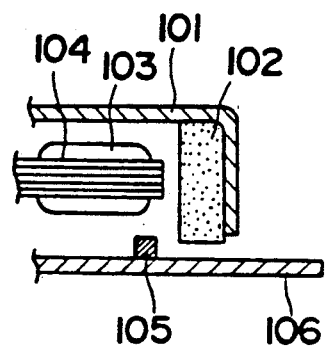
Figure 7B:
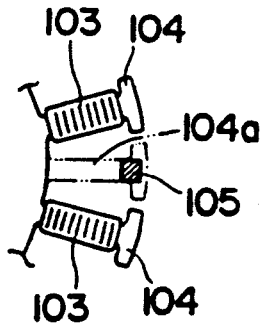
FIGS. 7A and 7B are views showing the positional relationship between hall elements and core windings of another conventional brushless core motor, the FIG. 7A being a fragmentary sectional view corresponding to FIG. 6A, while the FIG. 7B is a plan view corresponding to FIG. 6B.
Figure 7A:
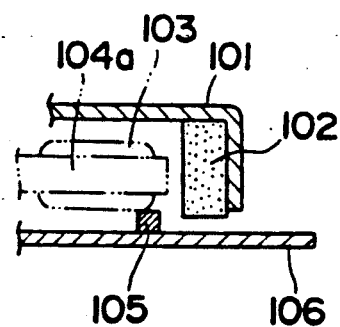

The absence of windings 3 in the neighborhood of the hall elements 5 is also advantageous in protecting the hall elements 5 against an undesired magnetic influence from the windings 3 during current flow in all the salient poles 2, 2a. Thus, from an oscillographic viewpoint, as in FIG. 4B, the output being supplied from the hall elements 5 results in an almost complete sine wave, indicating that the output supplied has minimized its distortion, as against the aforementioned prior art.

Although the above-described are some preferred embodiments, the present invention is not intended to be limited thereto, but various modifications, replacements and additions may structurally be possible without departing from the scope and spirit of the appended claims. For instance, the present invention may be applied to another three-phase brushless core motor that has only two magneto-sensitive elements against the windings; namely the case where the total number "n" of the magneto-sensitive elements is smaller than the number "m" of the winding phases. In that case, there should be defined such salient poles 2a without windings in the vicinity of the magneto-sensitive elements 5, irrespective of the number "m" of the winding phases. If two magneto-sensitive elements 5 are disposed on the substrate 6 in such a manner as to be positioned immediately below the salient poles 2a, the salient poles 2a above the elements 5 should be devoid of windings 3. With respect to the interrelation between the number m of the winding phases and the total number n of the magneto-sensitive elements 5, the interrelation is described in the foregoing embodiments by way of examples in which: there are windings 3 in three phases and five magneto-sensitive elements 5; and there are windings 3 in three phases and two magneto-sensitive elements. However, the present invention is not intended to be limited thereto. The present invention may be applied to any brushless motor insofar as there are windings 3 in "m" phases and "n" pieces of magneto-sensitive elements, wherein the terms, "m" and "n" refer to integers satisfying the relation of "$n \leq m$".

What is claimed is:

1. A brushless core motor comprising:
an armature core having the product m·k salient poles where k is an integer $\geq 2$, said core having a plurality of salient poles with windings in m phases where m is an integer $\geq 2$;
a rotor magnet rotatable about said salient poles;
n magneto-sensitive elements where n is an integer and $m \geq n \geq 1$, said elements adapted for detecting magnetic poles of said rotor magnet for controlling current into said windings;
wherein at least one salient pole has no windings, and said magneto-sensitive elements are adjacent to said winding-devoid salient pole.

2. A brushless core motor according to claim 1 wherein said $n \geq 2$.

3. The brushless core motor according to claim 1, wherein those salient poles with said windings in m phases comprise m·k salient poles, wherein said k expresses an integer $\geq$ two, each of said m·k salient poles carry one of said windings corresponding to one of said m phases, and wherein those salient poles positioned in the vicinity of said magneto-sensitive elements amount to n in total number, with said n salient poles being disposed in correspondence with the different respective ones of said m phases.

4. A brushless core motor comprising:
an armature core having the product m·k salient poles where said k is an integer $\geq 2$, said core having a plurality of salient poles with windings in m phases where said m is an integer $\geq 2$;
a rotor magnet rotatable about said salient poles;
all of said salient poles being of substantially equal dimensions and in a generally T-shaped configuration having a vertical lower body portion and an upper distal end extending along a circumferential direction of said magnet rotor in a symmetrical fashion in relation to said vertical lower body portion;
n magneto-sensitive elements, where said n is an integer and $m \geq n \geq 1$, said elements being adapted for detecting magnetic poles of said rotor magnet for controlling current into said windings;
wherein, of said salient poles, at least one salient pole, which is located adjacent to said magneto-sensitive elements, is devoid of windings, whereas the remaining of said salient poles are wound by said windings in correspondence with the respective phases, so that said magneto-sensitive elements are protected against a magnetic influence from said windings and leaking magnetic flux in the vicinity of said magneto-sensitive elements is reduced evenly throughout the circumference of said remaining salient poles wound by said windings, whereby said magneto-sensitive elements are not influenced by said leaking magnetic flux.

5. A brushless core motor according to claim 1, wherein all said vertical body portions of said salient poles are of substantially identical widths in said circumferential direction of said magnet motor.

6. A brushless core motor according to claim 1, wherein a portion of said upper distal end of said at least one salient pole, which faces toward said rotor magnet, is shaped to provide for less magnetic flux intensity upon said at least one salient pole than upon said remaining of said salient poles.

7. A brushless core motor according to claim 1, wherein said upper distal end of said at least one salient pole is so reduced as to decrease its width in said circumferential direction of said magnetic rotor, thereby providing for less magnetic flux intensity upon said at least one salient pole than upon said remaining of said salient poles.

8. A brushless core motor according to claim 6, wherein said portion of said upper distal end of said at least one salient pole is formed with a notched opening.

9. A brushless core motor according to claim 6, wherein said portion of said upper distal end of said at least one salient pole has reduced length and larger spacing from said rotor magnet.

10. A brushless core motor according to claim 1, wherein said upper distal end of said at least one salient pole has an asymmetrical shape, thereby providing for less magnetic flux intensity upon said at least one salient pole than upon said remaining of said salient poles.

11. A brushless core motor according to claim 1, wherein said armature core and said at least one salient pole integrally comprise a lamination of plural silicon steel plates, and wherein said at least one salient pole includes, at its said upper distal end, a stepped part adjacent said magneto-sensitive element, said stepped part being formed by partially cutting layers of said silicon steel plate lamination, and said layers being situated adjacent to said magneto-sensitive element, whereby said magneto-sensitive element is disposed in and under said stepped part, thereby providing for less magnetic flux intensity upon said at least one salient pole than upon said remaining of said salient poles.

12. A brushless core motor comprising:
  an armature core having the product m·k pieces of salient poles having windings in m phases, wherein said m and said k are integers $\geq 2$;
  a rotor magnet rotatable about said salient poles;
  all of said salient poles being of substantially equal dimensions and in a generally T-shaped configuration having a vertical lower body portion and an upper distal end extending along a circumferential direction of said magnet rotor in a symmetrical fashion in relation to said vertical lower body portion;
  n magneto-sensitive elements, wherein said magneto-sensitive elements are capable of detecting magnetic poles of said rotor magnet for control of said windings in said m phases and said n is $>1$;
  said magneto-sensitive elements being disposed adjacent to said salient poles and near said rotor magnet;
  wherein, of said salient poles, at least one salient pole, which is located adjacent to said magneto-sensitive elements, is devoid of windings, whereas the remaining of said salient poles are wound by said windings in correspondence with the respective phases, so that said magneto-sensitive elements are protected against a magnetic influence from said windings and a leaking magnetic flux in vicinity of said magneto-sensitive elements is reduced to an amount generally equal to that of leaking magnetic flux in vicinity of said remaining salient poles wound by said windings, whereby outputs from said magneto-sensitive elements are not influenced by said leaking magnetic flux.

* * * * *